United States Patent [19]

Aubry

[11] Patent Number: 4,706,364

[45] Date of Patent: Nov. 17, 1987

[54] PROCESS FOR CONNECTING AN ELEMENT TO ONE END OF A TUBE OF COMPOSITE MATERIAL AND DEVICE THUS OBTAINED

[75] Inventor: Jacques Aubry, Cabries, France

[73] Assignee: Societe Nationale Industrielle Aerospatiale, Paris, France

[21] Appl. No.: 822,240

[22] Filed: Jan. 24, 1986

[30] Foreign Application Priority Data

Jan. 28, 1985 [FR] France ............................... 85 01130

[51] Int. Cl.⁴ ............................................... B32B 5/12
[52] U.S. Cl. ......................................... 29/458; 29/525; 29/527.2; 156/294; 464/181
[58] Field of Search ...................... 29/458, 525, 527.2, 29/DIG. 1; 464/181, 183; 158/294, 295

[56] References Cited

U.S. PATENT DOCUMENTS

| | | | |
|---|---|---|---|
| 4,041,599 | 8/1977 | Smith | 29/458 X |
| 4,211,589 | 7/1980 | Fisher et al. | 29/458 X |
| 4,238,539 | 12/1980 | Yates et al. | 464/183 X |
| 4,238,540 | 12/1980 | Yates et al. | 464/183 X |
| 4,451,245 | 5/1984 | Hornig et al. | 29/525 X |
| 4,605,385 | 8/1986 | Puck et al. | 464/183 X |

FOREIGN PATENT DOCUMENTS 0046869  3/1982  European Pat. Off. ............ 464/181

Primary Examiner—Howard N. Goldberg
Assistant Examiner—Taylor J. Ross
Attorney, Agent, or Firm—Marshall, O'Toole, Gerstein, Murray & Bicknell

[57] ABSTRACT

This invention relates to a process for connecting an element to the end of a tube of composite material, wherein, at least at said end, said tube presents an annular cross-section of which the outer and inner contours are each constituted by a circular line or with interference of shapes, for example polygonal, and said element comprises a recess defined between two spaced apart coaxial prismatic or cylindrical walls, the annular section of said recess corresponding to that of said end so that the latter may be fitted in said element with interposition of an intercalated sleeve made of high-resistance fibers impregnated with resin or polymerizable elastomer. The invention is more particularly applicable to the production of torque tubes or power transmission shafts made of composite material.

10 Claims, 8 Drawing Figures

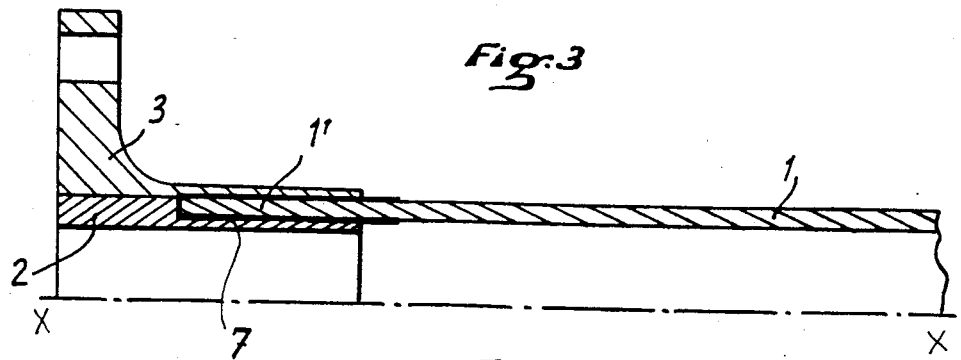
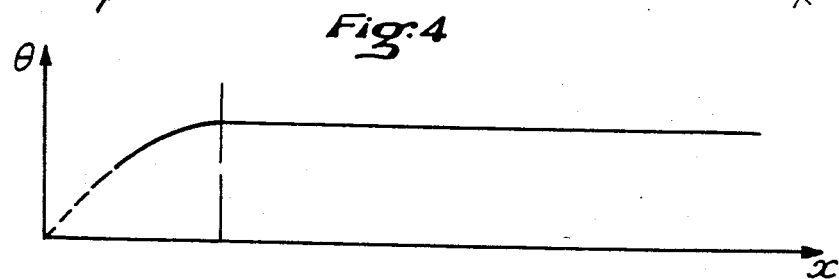
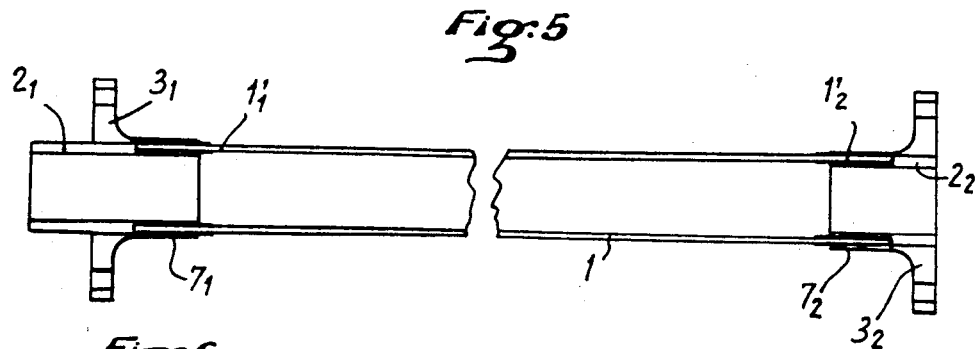
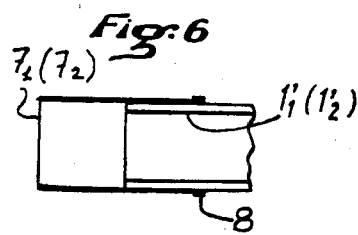
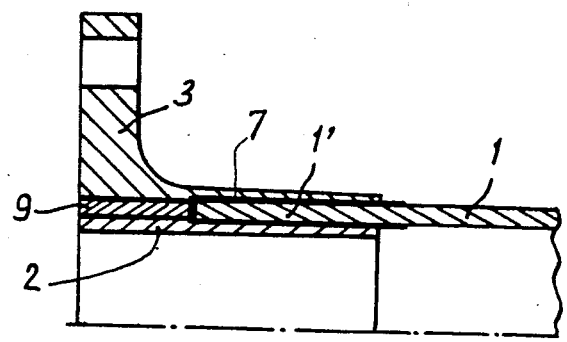

PROCESS FOR CONNECTING AN ELEMENT TO ONE END OF A TUBE OF COMPOSITE MATERIAL AND DEVICE THUS OBTAINED

The present invention relates to a process for connecting an element (for example a flange, sleeve, tubular extension, frame, etc.) to the end of a tube of composite material, and to the device thus obtained. The term "composite material" designates a material constituted by resistant fibers (glass, carbon, aramide, boron, etc.) disposed in organized manner in preferred orientations and coated with a resin or a polymerized elastomer.

It is known that tubes of composite material present high mechanical characteristics, despite their low weight, with the result that they are used more and more in mechanics, for example as torque tube or as power transmission shaft.

However, their connection or fit in other elements raises difficulties, particularly in the transmission of efforts.

It is an object of the present invention to overcome this drawback and to enable a connection of high mechanical resistance to be made between a tube of composite material and an outside element, which may, or may not, be made of composite material. It therefore enables the domain of use of such tubes to be extended.

To this end, according to the invention, the process for connecting an element to the end of a tube of composite material is noteworthy, on the one hand, in that, at least at said end, said tube presents an annular cross-section and in that said element comprises a recess defined between two spaced apart coaxial cylindrical walls, the annular section of said recess corresponding to that of said end so that the latter may be fitted with a certain clearance in said element and, on the other hand, in that an intercalated connecting sleeve is inserted between the walls of said recess and the inner and outer faces of the end of said tube and connected with said walls and said faces.

This intercalated sleeve presents the thickness and modulus of elasticity appropriate for the desired connection. For example, it is constituted by resistant fibers coated with resin or polymerizable elastomer and the orientation of said fibers is adjusted in order to obtain, when the connection is terminated, a progressive angular deflection all along the fit.

Thanks to the fit thus made, the efforts between said tube and said element pass simultaneously and progressively through the two faces (inner face and outer face) of the tube, with the result that a connection of high mechanical resistance, homogeneous with the high capacity of transmission of a torsional couple by the tube, is obtained simply.

In order further to increase the capacity of this connection and give it a redundant character, necessary in certain applications, in particular on transmission shafts used in aeronautics, said tube presents, at least at its end, an annular cross-section whose outer and inner contours present an interference of shapes, for example a polygonal line, and said element comprises a recess defined between two spaced apart coaxial prismatic walls, the annular section of said recess corresponding to that of said end so that the latter, provided with its intercalated sleeve, may be fitted in said element.

Thanks to the fit with interference thus made on the two faces of polygonal shapes of the end of the tube, a safety connection is thus obtained, for transmitting a high torsional couple, on which the connection of elements is effected both by adherence of the walls and by mechanical jamming of the male and female elements.

In order to facilitate the assembly according to the invention, said element is advantageously made of two connectable parts, of which one comprises the outer wall of said recess and the other the inner wall thereof, such connection being able to be made by force fitting two constituted parts or be obtained by a means of sticking.

The device according to the invention, comprising at least one tube of composite material and at least one element connected together in the manner described hereinabove, may be used in numerous applications. For example, it may constitute a torque tube for vehicle suspension or a power transmission shaft. In that case, said element is generally a flange and such an element may be provided at each end of said tube.

The invention will be more readily understood on reading the following description with reference to the accompanying drawings, in which.

FIG. 3 schematically shows, in axial section, another assembly according to the invention in connection with FIG. 4 which illustrates the variation of the angle of torque along the fit and along the tube of said assembly.

FIG. 5 shows a torque tube for vehicle suspension made according to the invention.

FIGS. 6 and 7 illustrate the positioning of the intercalated sleeve for transmission of efforts.

FIG. 8 schematically shows a variant embodiment of the assembly according to the invention.

Figure 1:
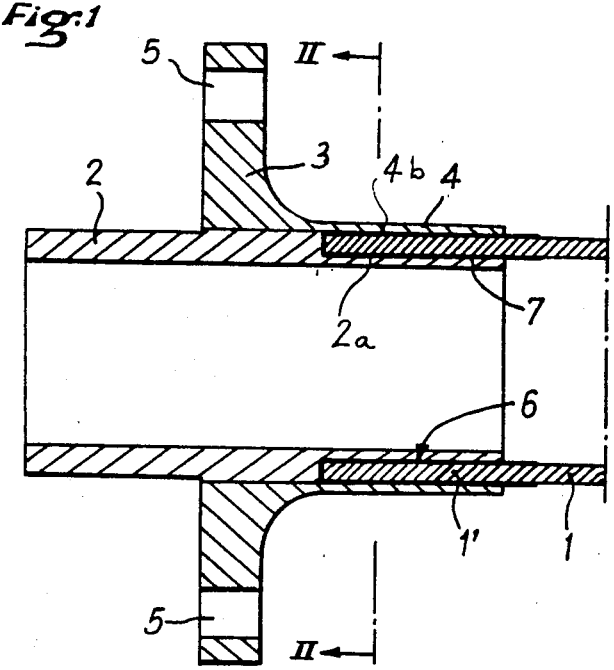
FIG. 1 shows, in axial section, an assembly according to the invention.
Figure 2:
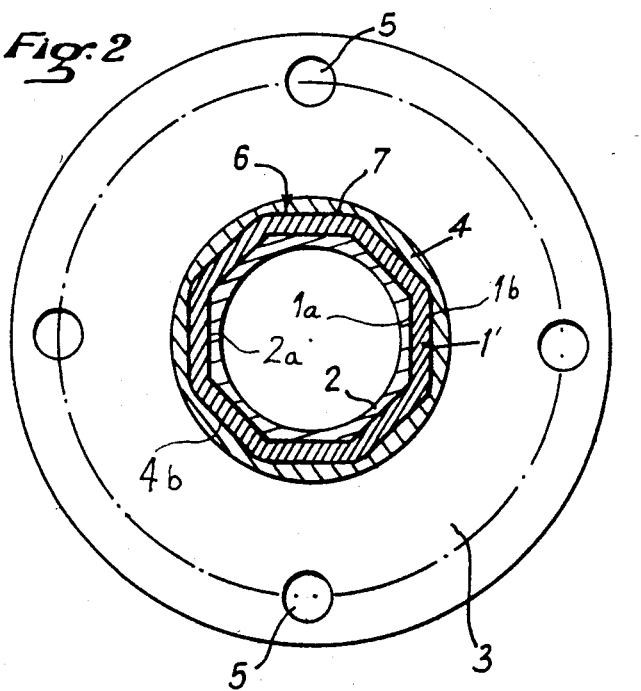
FIG. 2 is a radial section, along line II—II of FIG. 1, of the assembly shown in this FIG. 1.

Referring now to the drawings, the assembly according to the invention, shown in FIGS. 1 and 2, comprises a tube 1 of composite material and a flange having to be connected with the end 1' of said tube.

As may be seen in FIG. 2, the tube 1, or at least its end 1', presents an annular cross-section of which the inner contour 1a and outer contour 1b are, in the example shown, each constituted by an octogonal line.

Said flange is composed of a hub 2 and of a disc 3 extended by a tubular part 4, coaxial and outside hub 2.

Disc 3 is provided with holes 5 adapted to receive means for assembly on another flange (not shown).

Between the hub 2 and the tubular part 4 is formed a recess 6, defined between an inner prismatic wall 2a provided on the outer surface of said hub and an outer prismatic wall 4b provided on the inner surface of said tubular part 4. The prismatic walls 2a and 4b are coaxial and disposed so that the annular section of said recess 6 corresponds to the annular section of the end 1' of the tube 1 and makes a certain clearance with respect thereto.

In this space made between the inner and outer faces of the end of tube 1 and recess 6 in flange 2, 3, there is disposed an intercalated sleeve 7 adhering to said inner and outer faces, on the one hand, of the end 1' of tube 1 and, on the other hand, of recess 6 in flange 2, 3. This intercalated sleeve, adapted to ensure progressive mutual transmission of the efforts between flange 2, 3 and tube 1, is for example constituted by a section of braided sleeving made of resistant fibers coated with resin or polymerizable elastomer, this resin ensuring, after polymerization, the connection with flange 2, 3 and tube 1. The thickness and orientation of the fibers of intercalated sleeve 7 are adjusted in order to regulate the progressive angular deflection of torque all along the fit.

FIGS. 3 and 4 illustrate the evolution of the angle of torque $\theta$, which is constant as a function of the abscissa x along axis X—X of the assembly, and varies progressively along the fit of the end $1'$ in the flange 2, 3. Such a progressive introduction of the efforts makes it possible to limit the over-stresses due to the sudden variations in deflections at fit.

FIG. 5 shows a torque tube or power transmission shaft according to the invention, comprising a tube 1 of composite material provided with flanges $2_1$, $3_1$ and $2_2$, $3_2$ at its two ends $1'_1$ and $1'_2$, of polygonal section (as in FIG. 2).

In order to obtain the torque tube or power transmission shaft of FIG. 5, a sleeve $7_1$ or $7_2$ of resistant fibers, having for example the structure of a braid, is firstly positioned on the polygonal outer wall of the two free ends of the tube 1. Each sleeve $7_1$ and $7_2$ is blocked on the corresponding end $1'_1$ or $1'_2$ by means of a locking collar 8 so as to extend said ends outwardly (cf. FIG. 6). Each sleeve $7_1$ and $7_2$ is then impregnated with polymerizable resin and the outwardly projecting part of said sleeves is folded inside the corresponding end $1'_1$ and $1'_2$ (cf. FIG. 7).

Hubs $2_1$ and $2_2$ of the flanges are then fitted in said ends $1'_1$ and $1'_2$, with the result that the resistant fibers constituting sleeves $7_1$ and $7_2$ stretch and the excess resin impregnating same is driven out.

Locking collars 8 are then removed and the surfaces of parts $2_1$, $3_1$ and $2_2$, $3_2$ intended to come into contact are coated with resin. Discs $3_1$ and $3_2$ are then fitted respectively on hubs $2_1$ and $2_2$. The excess resin is eliminated and the whole is polymerized.

It will be readily understood that the production of flanges in two parts (hubs 2, $2_1$, $2_2$ and discs 3, $3_1$, $3_2$) facilitates on the one hand the formation of the prismatic surfaces 2a and 4b and, on the other hand, the assembly of said flanges on the ends of tube 1. In the event of the flanges being constituted by composite material, they may be made by winding and moulding. The same applies to tube 1 and its ends with polygonal cross-section.

In the embodiments of FIGS. 1, 3 and 5, the prismatic walls 2a and 4b extend axially only over part of hubs 2, $2_1$, $2_2$ or tubular parts 4, respectively. In order further to facilitate the production of parts 2 and 3-4, it may be advantageous, as illustrated in FIG. 8, if said prismatic walls 2a and 4b extend axially over the whole of said parts. In that case, a ring 9 is provided to close that part of the recess 6 not obturated by the corresponding end $1'$.

What is claimed is:

1. A process for connecting an element to an end of a tube having an annular cross-section, said element comprising a recess defined between two spaced apart coaxial cylindrical walls, said process comprising the steps of intercalating a sleeve coated with a curable resin or elastomer between the walls of said recess and the inner and outer faces of said end of said tube, and curing said resin or elastomer to interconnect said walls and said faces.

2. The process of claim 1, wherein the intercalated sleeve is constituted by a section of braided sleeving of high resistance fibers.

3. The process of claim 1, wherein the inner and outer contours of the annular section of the end of the tube are shaped as polygonal lines and the recess made in the element comprises two spaced apart coaxial prismatic walls, the annular section of said recess corresponding to that of said end, so that the latter, provided with its intercalated sleeve, may be fitted in said element.

4. The process of claim 1, wherein said element is made in two connectable parts of which one comprises the outer wall and the other the inner wall defining said recess.

5. A process in accordance with claim 1 wherein said sleeve is folded to cover said inner and outer faces of said end of said tube.

6. A device comprising at least one tube made of composite material and at least one element connected to each other, wherein the assembly between the tube and the element is effected in accordance with the process as set forth in claim 1.

7. The device of claim 6, wherein said element is a flange.

8. The device of claim 6, wherein said tube comprises such an element at each of its ends.

9. The device of claim 6, wherein it constitutes a torque tube for vehicle suspension.

10. The device of claim 6, wherein it constitutes a power transmission shaft.

* * * * *